United States Patent
Song et al.

(10) Patent No.: US 8,677,245 B2
(45) Date of Patent: Mar. 18, 2014

(54) APPARATUS AND METHOD OF GROUPING AND DISPLAYING MESSAGES

(75) Inventors: Mee Sun Song, Yongin-si (KR); Jung Hwan Kim, Seoul (KR); Won-Kyu Lee, Goyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 543 days.

(21) Appl. No.: 12/715,489

(22) Filed: Mar. 2, 2010

(65) Prior Publication Data

US 2010/0332518 A1    Dec. 30, 2010

(30) Foreign Application Priority Data

Jun. 26, 2009 (KR) .................. 10-2009-0057403

(51) Int. Cl.
*G06F 3/00* (2006.01)

(52) U.S. Cl.
USPC .......................................... 715/738

(58) Field of Classification Search
USPC ........... 715/738, 752, 758; 738/738, 752, 758
See application file for complete search history.

(56) References Cited

U.S. PATENT DOCUMENTS

| | | | | |
|---|---|---|---|---|
| 6,809,724 | B1 * | 10/2004 | Shiraishi et al. | 345/169 |
| 7,117,453 | B2 * | 10/2006 | Drucker et al. | 715/833 |
| 2009/0005011 | A1 | 1/2009 | Christie et al. | |

FOREIGN PATENT DOCUMENTS

| | | |
|---|---|---|
| JP | 2002344575 | 11/2002 |
| KR | 1020050053887 | 6/2005 |
| KR | 1020060039505 | 5/2006 |
| KR | 1020060054828 | 5/2006 |
| KR | 1020060059463 | 6/2006 |
| KR | 1020060067379 | 6/2006 |
| KR | 1020060078829 | 7/2006 |
| KR | 1020070010644 | 1/2007 |
| KR | 1020070025184 | 3/2007 |
| KR | 1020070029983 | 3/2007 |
| KR | 1020090024418 | 3/2009 |

* cited by examiner

*Primary Examiner* — Thanh Vu
(74) *Attorney, Agent, or Firm* — NSIP Law

(57) ABSTRACT

Provided are an apparatus and method of grouping and displaying messages. The apparatus verifies a grouping condition corresponding to messages, generates group message boxes obtained by grouping the messages based on the grouping condition, and displays the group message boxes. The group message boxes are connected with a reference axis, and the reference axis is used to arrange the group message boxes according to the grouping condition.

20 Claims, 14 Drawing Sheets

APPARATUS AND METHOD OF GROUPING AND DISPLAYING MESSAGES

CROSS-REFERENCE TO RELATED APPLICATION

This application claims the benefit under 35 U.S.C. §119(a) of a Korean Patent Application No. 10-2009-0057403, filed on Jun. 26, 2009, in the Korean Intellectual Property Office, the entire disclosure of which is incorporated herein by reference for all purposes.

BACKGROUND

1. Field

The following description relates to an apparatus and method of grouping and displaying messages, and additionally, to an apparatus and method of grouping transmitted and/or received messages in a handheld terminal using various standards, and automatically displaying the grouped messages.

2. Description of Related Art

Recent use of handheld communication devices such as cellular telephones, smart-phones, etc., has increased significantly. Accordingly, use of a Short Message Service (SMS) has become an important means of communication.

Typically, handheld communication devices allow sent and received SMS messages to be separately managed under different menus, and each of the sent messages and received messages may be each displayed chronologically in the form of a list, respectively. However, since the sent messages and the received messages are stored in separate menus, it may be difficult to determine the flow of messages and conversations between users. That is, in order for a user to view both sides of a text conversation, the user must toggle between the "sent messages" menu and the "received messages" menu.

Due to previous storage capacity limits on handheld communication devices, an amount of allowable stored messages were small, thereby resulting in lost text conversations. Recently however, storage capacity limits on handheld communication devices have increased due to larger memory drives and use of memory sticks. Accordingly, a very large number of messages may be accumulated, and therefore it may be cumbersome and inconvenient for a user to search back and forth between menus to view both the sent and received messages in order to see both sides of a text conversation.

SUMMARY

In one general aspect, there is provided an apparatus to group and display messages, the apparatus including a message box generation unit to verify a grouping condition with respect to messages, and to generate group message boxes obtained by grouping the messages in accordance with the grouping condition, and a screen configuration unit to configure an output screen by outputting a reference axis to arrange the group message boxes in accordance with the grouping condition, and by connecting the group message boxes with the reference axis.

The message may be at least one of a Short Message Service (SMS) sending message, an SMS receiving message, a multimedia sending message, a multimedia receiving message, an e-mail sending message, and an e-mail receiving message.

The screen configuration unit may configure the reference axis to be vertically or horizontally output on the output screen, arrange the group message boxes on the left and right of the reference axis in response to the reference axis being vertically output, and arrange the group message boxes above and below the reference axis in response to the reference axis being horizontally output.

The message box generation unit may generate a predetermined number of current messages as individual message boxes without grouping the predetermined number of current messages, and the screen configuration unit may configure the output screen by outputting the reference axis and connecting the group message boxes and the individual message boxes with the reference axis.

The grouping condition may be at least one condition of a time grouping for grouping the messages in a predetermined time interval based on a transmitted or received time, an object grouping to group the messages based on an object to be transmitted and/or received, a type grouping to group the messages based on a type of the message, a number grouping to group the messages by a number of predetermined messages, and a content based grouping to group the messages based on contents of the message.

The reference axis may be at least one of a time reference axis to indicate a passage of time, a dictionary reference axis to arrange an object in a dictionary manner, and a type reference axis to arrange a type of the message according to a type of the message.

The apparatus may further include a user interface unit to announce a change in the grouping condition to the message box generation unit, in response to a sensed touch on the reference axis via a touch screen.

The apparatus may further include a user interface unit to sense that an omission message box to be omitted due to combination, from among the group message boxes or the individual message boxes, is selected and dragged, and the omitted message box is dropped on an addition message box to be added due to the combination from among the group message boxes or the individual message boxes. In this instance, the message box generation unit may generate, in a location of the addition message box, a group message box including the addition message box and the omission message box.

The apparatus may further include a user interface unit to sense a group message box to be divided is selected through a plurality of touches. In this instance, the message box generation unit may divide the group message box to be divided into a predetermined number of group message boxes or individual message boxes in accordance with the grouping condition.

The apparatus may further include a search unit to verify a location of a search indicator moved on the reference axis, in response to a detailed search being requested, and to search to find messages corresponding to the reference axis in response to the search indicator being located. In this instance, the message box generation unit may generate retrieved messages as the group message boxes or as the individual message boxes, and the screen configuration unit may configure the output screen by outputting the reference axis and the search indicator, and connecting the group message boxes or the individual message boxes with the reference axis.

The search unit may verify a level of the search indicator, determine whether to generate the retrieved messages as the group message boxes or the individual message boxes, and provide the determined result to the message box generation unit.

In another general aspect, there is provided a method of grouping and displaying messages, the method including verifying a grouping condition with respect to messages, generating group message boxes obtained by grouping the messages in accordance with the grouping condition, and configuring an output screen by outputting a reference axis to arrange the group message boxes in accordance with the grouping condition, and by connecting the group message boxes with the reference axis.

The message may be at least one of an SMS sending message, an SMS receiving message, a multimedia sending message, a multimedia receiving message, an e-mail sending message, and an e-mail receiving message.

The configuring may include configuring the reference axis to be vertically or horizontally output on the output screen, arranging the group message boxes on the left and right of the reference axis in response to the reference axis being vertically output, and arranging the group message boxes above and below the reference axis in response to the reference axis being horizontally output.

The method may further include generating a predetermined number of current messages as individual message boxes without grouping the predetermined number of current messages. In this instance, the configuring may configure the output screen by outputting the reference axis and connecting the group message boxes and the individual message boxes with the reference axis.

Also, the grouping condition may be at least one condition of a time grouping for grouping the messages in a predetermined time interval based on a transmitted or received time, an object grouping to group the messages based on an object to be transmitted/received, a type grouping to group the messages based on a type of the message, a number grouping to group the messages by a number of predetermined messages, and a context based grouping to group the messages based on contents of the message.

Also, the reference axis may be at least one of a time reference axis to indicate a passage of time, a dictionary reference axis to arrange an object in a dictionary manner, and a type reference axis to arrange a type of the message according to a type of the message.

The method may further include changing the grouping condition in response to a sensed touch on the reference axis via a touch screen.

The method may further include selecting and dragging an omission message box to be omitted due to a combination from among the group message boxes or the individual message boxes, dropping the omission message box on an addition message box to be added due to the combination from among the group message boxes or the individual message boxes, and generating, in a location of the addition message box, a group message box including the addition message box and the omission message box.

The method may further include selecting a group message box to be divided through a plurality of touches, and dividing the group message box to be divided into a predetermined number of group message boxes or individual message boxes in accordance with the grouping condition.

The method may further include verifying a location of a search indicator moved on the reference axis when a detailed search is requested, searching to find messages corresponding to the reference axis where the search indicator is located, generating retrieved messages as the group message boxes or as the individual message boxes, configuring the output screen by outputting the reference axis and the search indicator, and by connecting the group message boxes or the individual message boxes with the reference axis, and outputting the output screen.

The method may further include verifying a level of the search indicator. In this instance, the generating of the retrieved messages may determine whether to generate the retrieved messages as the group message boxes or the individual message boxes in accordance with the level of the search indicator.

Other features and aspects will be apparent from the following detailed description, the drawings, and the claims.

Figure 1:
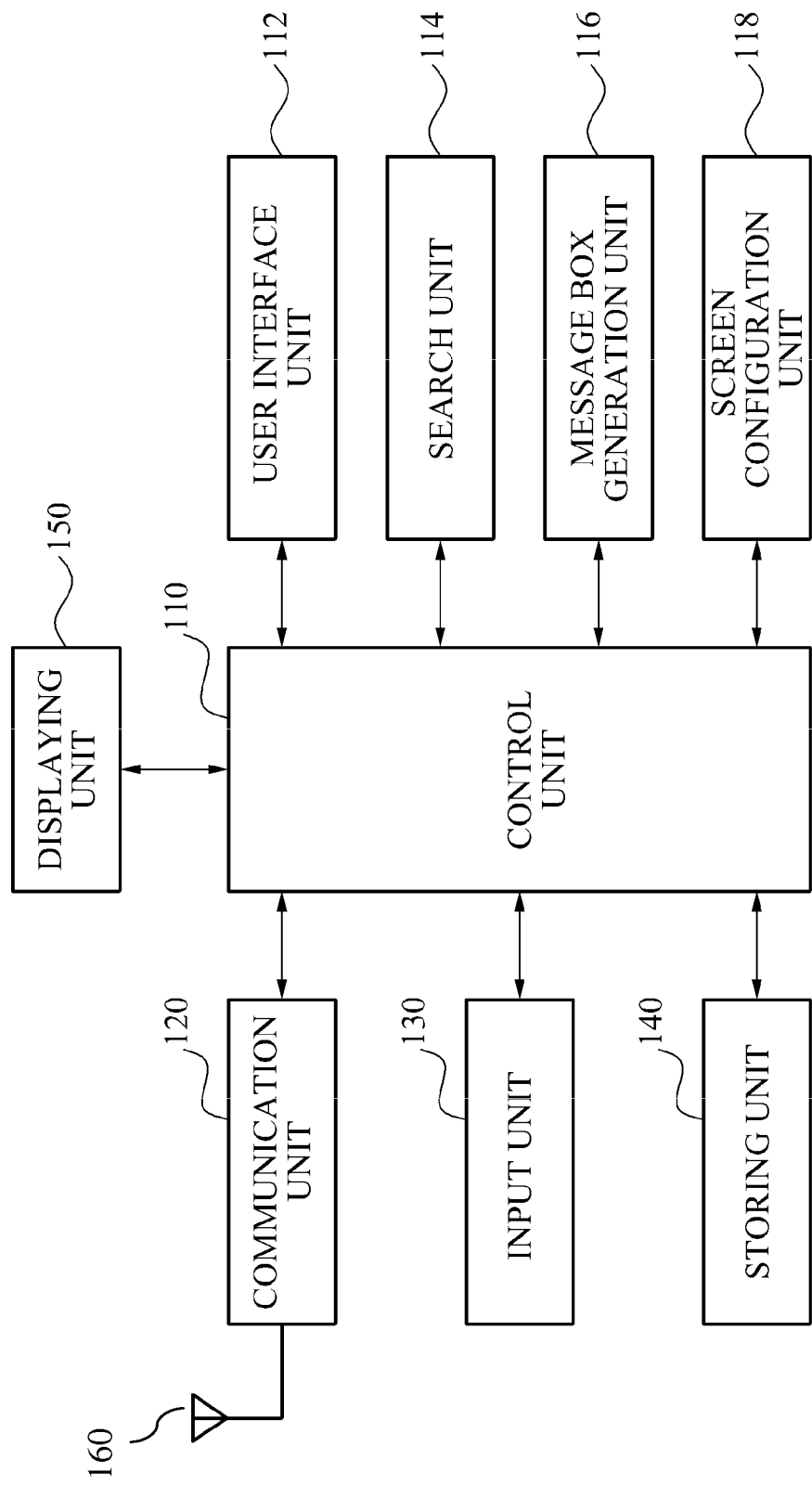
FIG. 1 is a diagram illustrating an exemplary apparatus to group and display messages.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses, and/or methods described herein will be suggested to those of ordinary skill in the art. Also, descriptions of well-known functions and constructions may be omitted for increased clarity and conciseness.

FIG. 1 illustrates an exemplary apparatus to group and display messages.

Referring to FIG. 1, the apparatus to group and display messages includes a control unit 110, a user interface unit 112, a search unit 114, a message box generation unit 116, a screen configuration unit 118, a communication unit 120, an input unit 130, a storing unit 140, and a displaying unit 150.

The communication unit 120 may transmit and/or receive various messages such as a Short Message Service (SMS) message, a Multimedia Messaging Service (MMS) message, an e-mail message, etc. Also, in response to receiving data, the communication unit 120 may frequency-down convert a radio frequency signal received from an antenna 160 to perform a dispreading and channel decoding on the received signal. Also, in response to transmitting data, the communication unit 120 may perform a channel coding and spreading on data and frequency-up convert data to transmit data via the antenna 160.

The input unit 130 may include a key pad and/or an input device such as a touch screen, voice-activated input unit, etc., to allow a user to input data to be read and interpreted by the control unit 110. In this case, the key pad may include numeral keys '0' through '9,' a menu key, a cancel key (CANCEL), a confirmation key (OK), a talk key (TALK), an end key (END), an Internet connection key, navigation keys (▲/▼/◀/▶), etc.

The storing unit 140 may store various types of data, including a program to control general operations of the apparatus to group and display the messages, an application program, data for storage (phone numbers, compressed image files, pictures, photos, and moving pictures, etc.), and various types of messages.

The displaying unit 150 may display state information (or state indicators), limited numerals and letters, moving pictures, still pictures, etc., which are generated while the apparatus is being operated. Also, the displaying unit 150 may display a message output screen in which grouped message boxes are connected with a reference axis. The display unit 150 may include a liquid crystal display (LCD), but is not limited thereto.

The user interface unit 112 may include an interface to which a user may provide inputs such as a grouping condition, a search object, a type of the reference axis, a change in a width of the reference axis, a level of a search indicator, a location of the search indicator, a combination and division of message boxes, etc.

Accordingly, at least one of an SMS sending message, an SMS receiving message, a multimedia sending message, a multimedia receiving message, an e-mail sending message, and an e-mail receiving message may be used as a search object.

Referring to the user interface unit 112 of FIG. 1, examples of the grouping condition include a time grouping to group the messages in a predetermined time interval based on a transmitted or received time, an object grouping to group the messages based on an object to be transmitted/received, a type grouping to group the messages based on a type of the message, a number grouping to group the messages by a number of predetermined messages, and a context based grouping to group the messages based on contents of the message.

The user interface unit 112 may announce a change in the grouping condition to the message box generation unit 116 in response to sensing a user's touching of the reference axis via the touch screen included in the input unit 130.

Referring to the user interface unit 112 of FIG. 1, examples of the reference axis include a time reference axis to indicate a passage of time, a dictionary reference axis to arrange an object in a dictionary manner, and a type reference axis to arrange a type of the message according to a type of the message may be given. Examples of outputting of a message box according to the grouping condition and the reference axis will be described in detail with reference to FIGS. 2 through 4.

Figure 2:
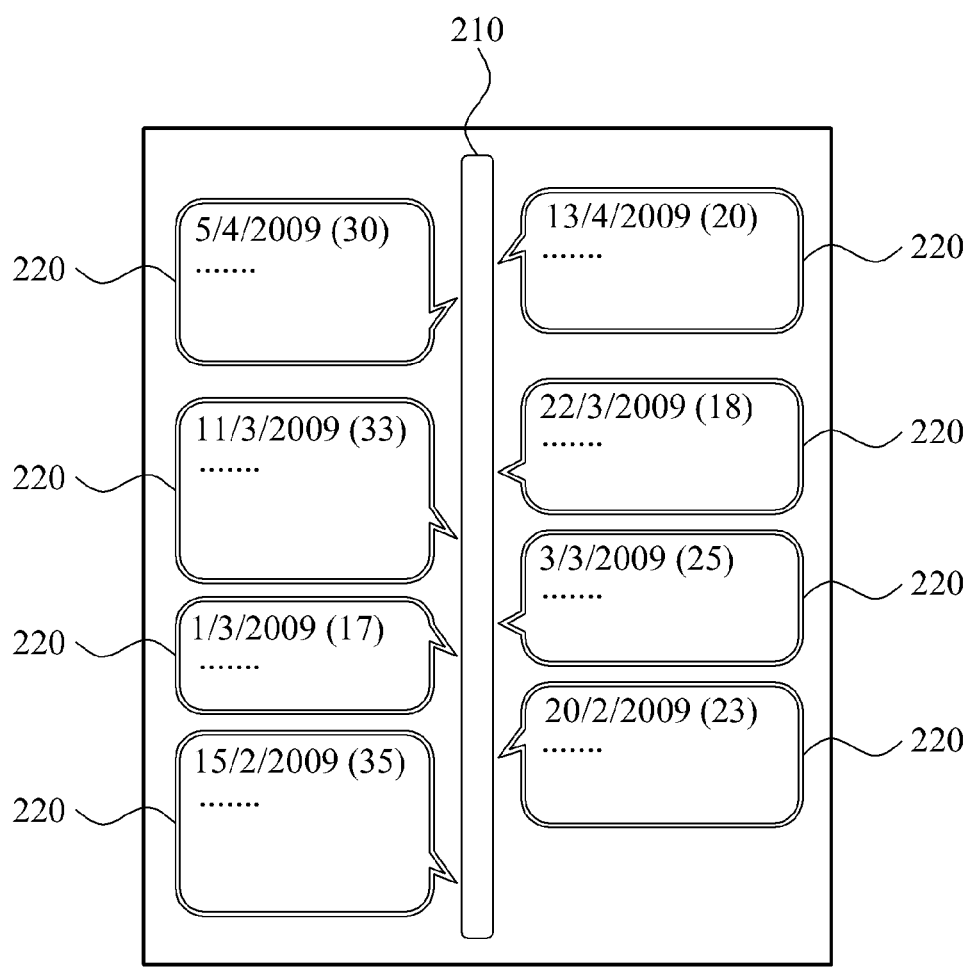
FIG. 2 illustrates an exemplary output screen in which messages are grouped.

FIG. 2 illustrates an exemplary output screen in which messages are grouped. In the output screen of FIG. 2, the grouping condition is the time grouping and the reference axis is the time reference axis 210. A sending time or a receiving time of a representative message from among messages included in the group message boxes 220 may be displayed on the group message boxes 220. According to FIG. 2, the representative message may be a first transmitted or received message, a message designated by a user, or a contextually important message, from among group messages included in the group message boxes 220.

Figure 3:
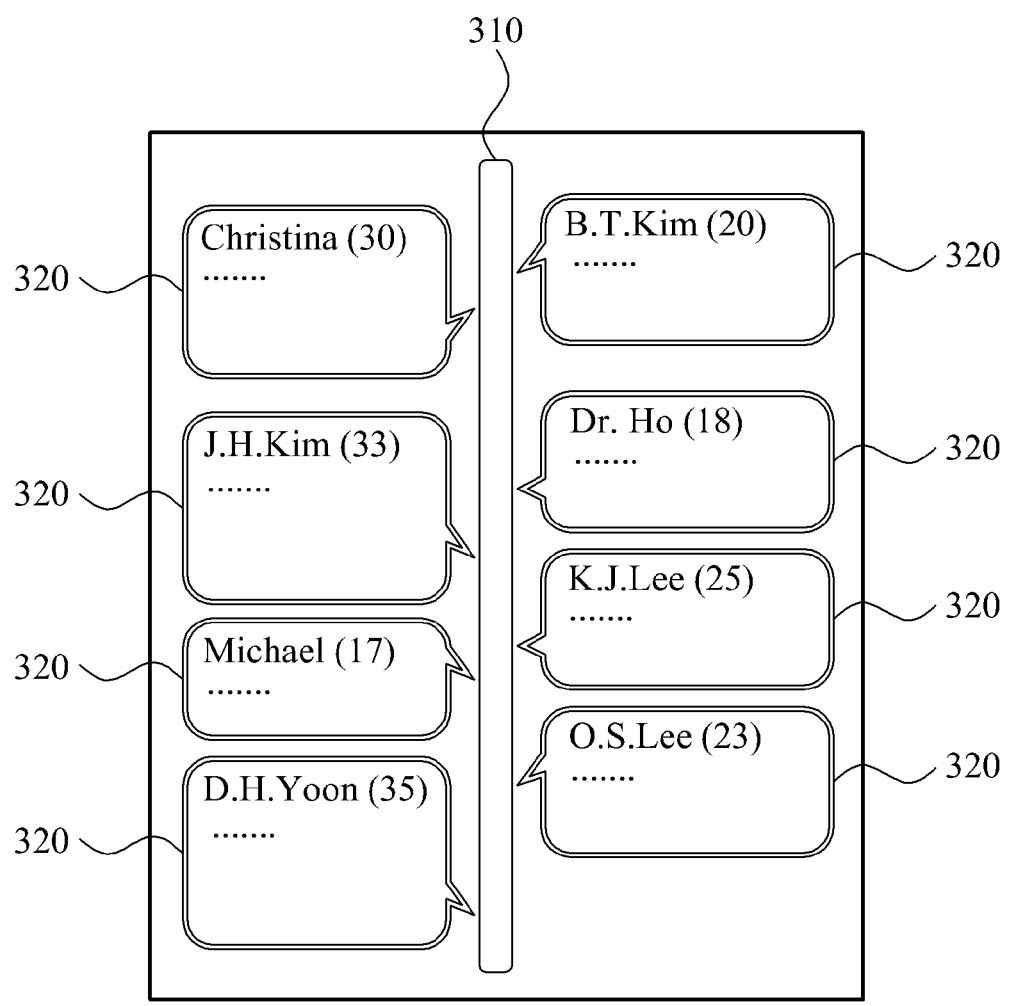
FIG. 3 illustrates another exemplary output screen in which messages are grouped.

FIG. 3 illustrates another exemplary output screen in which messages are grouped. In the output screen of FIG. 3, the grouping condition is the object group, and the reference axis is a dictionary reference axis 310. The group message boxes 320 which are obtained by grouping transmitted/received messages with a specific object may display a name or phone number of the object thereupon. Also, a time of a representative message included in the group message boxes 320 may be displayed depending on a predetermined setting. According to FIG. 3, the representative message may be a first transmitted or received message, a message designated by a user, or a contextually important message from among messages included in the group message boxes 320.

Figure 4:
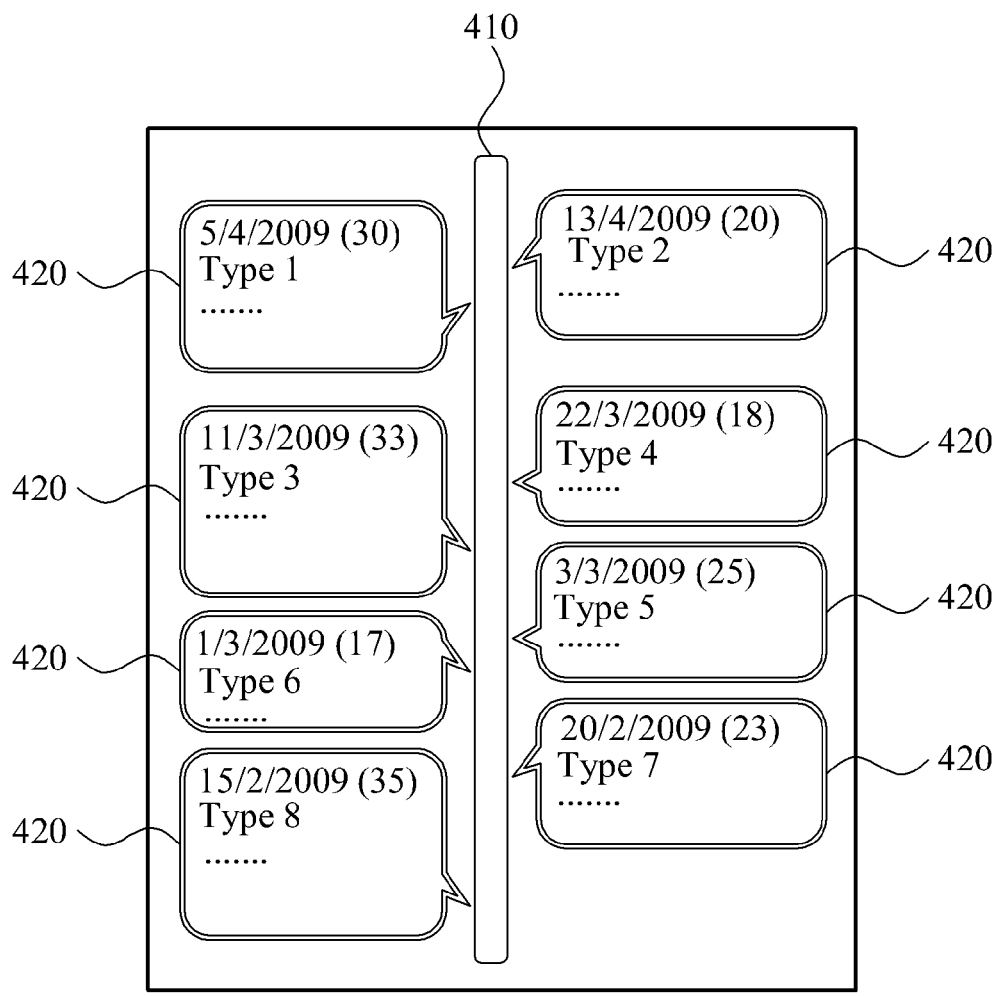
FIG. 4 illustrates another exemplary output screen in which messages are grouped.

FIG. 4 illustrates another exemplary output screen in which messages are grouped. In the output screen of FIG. 4, the grouping condition is the type grouping, and the reference axis is a type reference axis 410. The group message boxes 420 which are obtained by grouping messages corresponding to each type of the messages may display a message type on the group message boxes 420. Also, a time of a representative message included in the group message boxes 420 may be output. According to FIG. 4, the representative message may be a first transmitted/received message from among messages included in the group message boxes 420.

A change in a width of the reference axis received in the user interface may designate a change in a search range. For example, as illustrated in FIG. 6, where the reference axis is the time reference axis, message boxes with respect to the transmitted and/or received messages for a relatively longer period of time may be generated when the width of the time reference axis is widened, as compared to when the width of the time reference axis is reduced.

Figure 6:
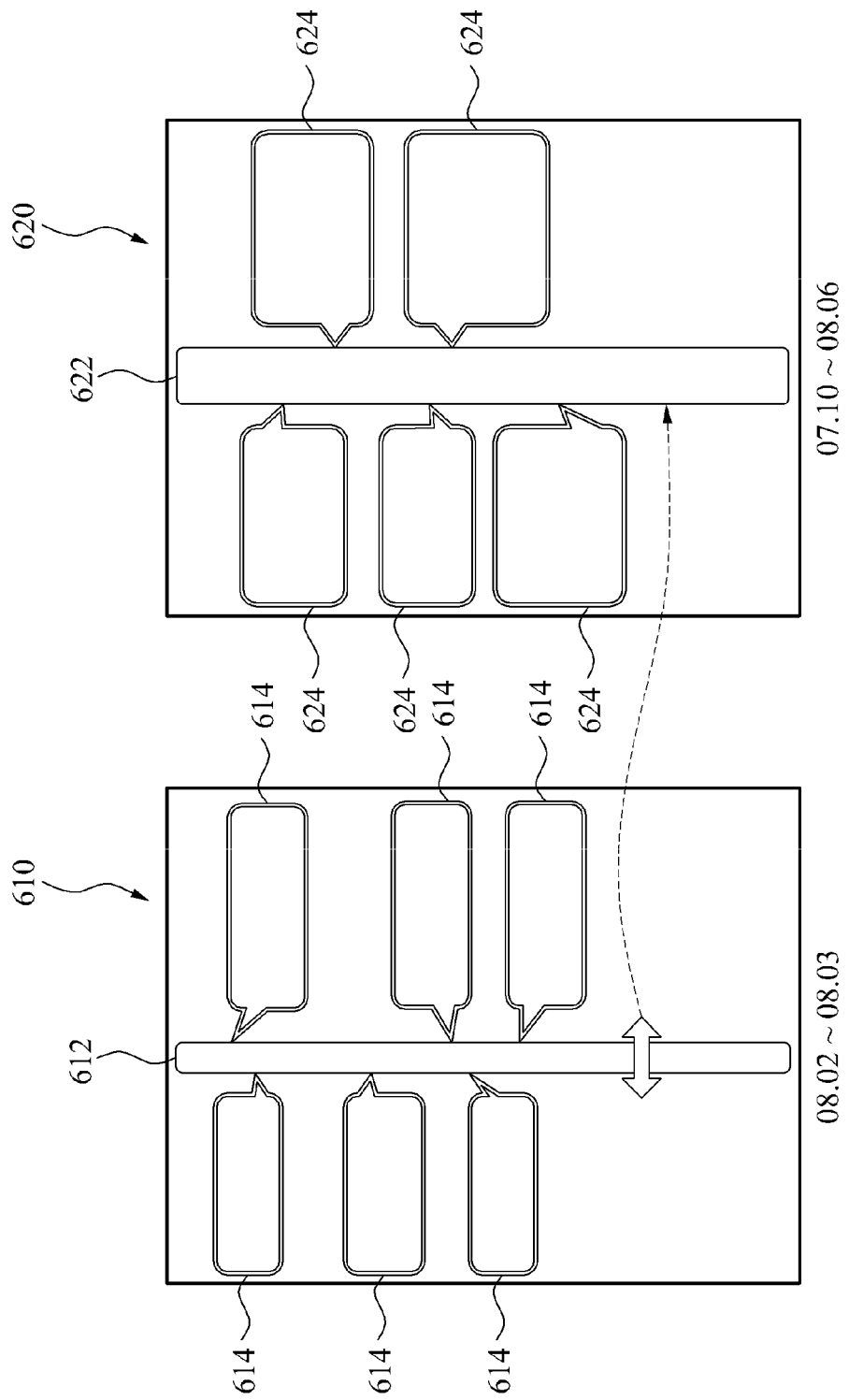
FIG. 6 is a diagram illustrating exemplary adjustment of a search range.

FIG. 6 illustrates an exemplary adjustment of a search range. Referring to FIG. 6, before widening and/or reducing the reference axis of a time reference axis 612, an output screen 610 may be configured with group message boxes 614 using messages of a search range from February, 2008 to March, 2008. Next, as illustrated on the output screen 620 of FIG. 6, a reference axis of a time reference axis 620 is widened, and the output screen 620 may be configured with group message boxes 624 using messages of a search range from October, 2007 to June, 2008.

Referring back to FIG. 1, the message box generation unit 116 may generate group message boxes including at least two messages and individual message boxes including a single message. The message box generation unit 116 may group messages in a grouping condition to generate the grouped messages as the group message boxes.

Accordingly, the message box generation unit 116 may express the group message boxes and the individual message boxes using different colors or different shades.

Also, referring to FIG. 1, the message box generation unit 116 may express the group message boxes and the individual message boxes using a predetermined color or shades depending on a number of messages included in the group message box. For example, in response to a number of the messages included in the group message boxes increasing, the message box generation unit 116 may express the group message box to have a darker color. The message box generation unit 116 may express the number of the messages which are included in the group message box on the group message box.

Also, the message box generation unit 116 may express a ratio of transmitted and/or received messages included in the group message boxes using the color and shade of the group message box.

Furthermore, the message box generation unit 116 may express, using an arrow, whether the individual message box is a transmitted message or a received message.

The search unit 114 may verify a level of a search indicator moved on the reference axis and a location of the search indicator when a search is requested through the search indicator. The search unit 114 may search to find messages corresponding to the reference axis where the search indicator is located, and request to generate the retrieved messages as a message box corresponding to the level of the search indicator.

The screen configuration unit 118 may vertically or horizontally output the reference axis, and connect the group message boxes or the individual message boxes which are generated in the message box generation unit 116, with the reference axis to configure the output screen, and then output the configured output screen through the display unit 150.

Figure 5:
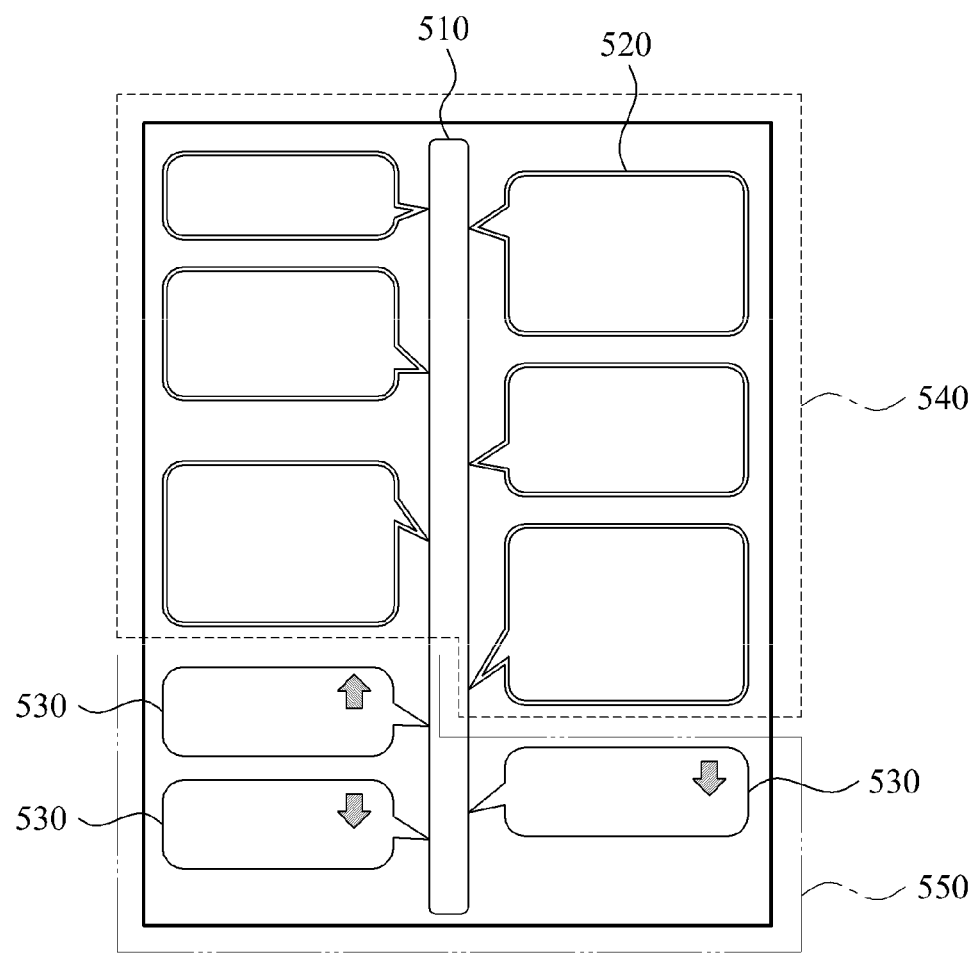
FIG. 5 illustrates another exemplary output screen in which messages are grouped.

FIG. 5 illustrates another exemplary output screen in which messages are grouped. In the output screen of FIG. 5, a reference axis 510 may be vertically output, and group message boxes 520 and individual message boxes 530 may be output on the left and right of the reference axis. According to FIG. 5, the individual message boxes 530 may be most recent messages, and classified into a group message range 540 and an individual message range 550 where the reference axis 510 is based on a time.

Figure 7:
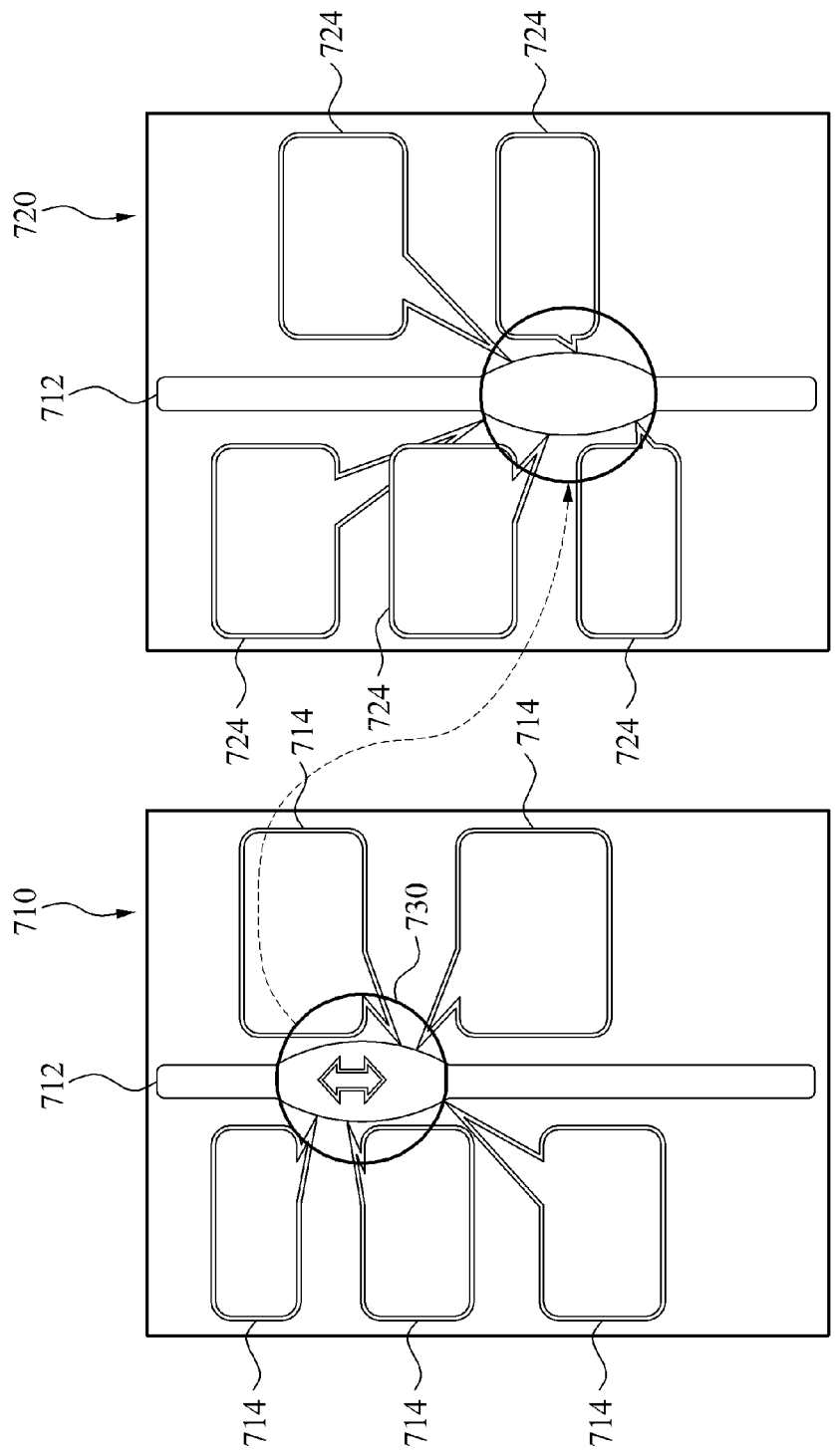
FIG. 7 illustrates an exemplary output screen using a search indicator.

FIG. 7 illustrates an exemplary output screen using a search indicator 730. Referring to FIG. 7, retrieved messages may be changed depending on a location of the search indicator 730 moved vertically on a reference axis 712. In an output screen 710, before movement of the search indicator 730, messages of a range corresponding to the location of the search indicator 730 may be expressed as group message boxes 714. In an output screen 720 after the movement of the search indicator 730, messages of a range corresponding to a location of the moved search indicator 730 may be expressed as group message boxes 724.

Figure 8:
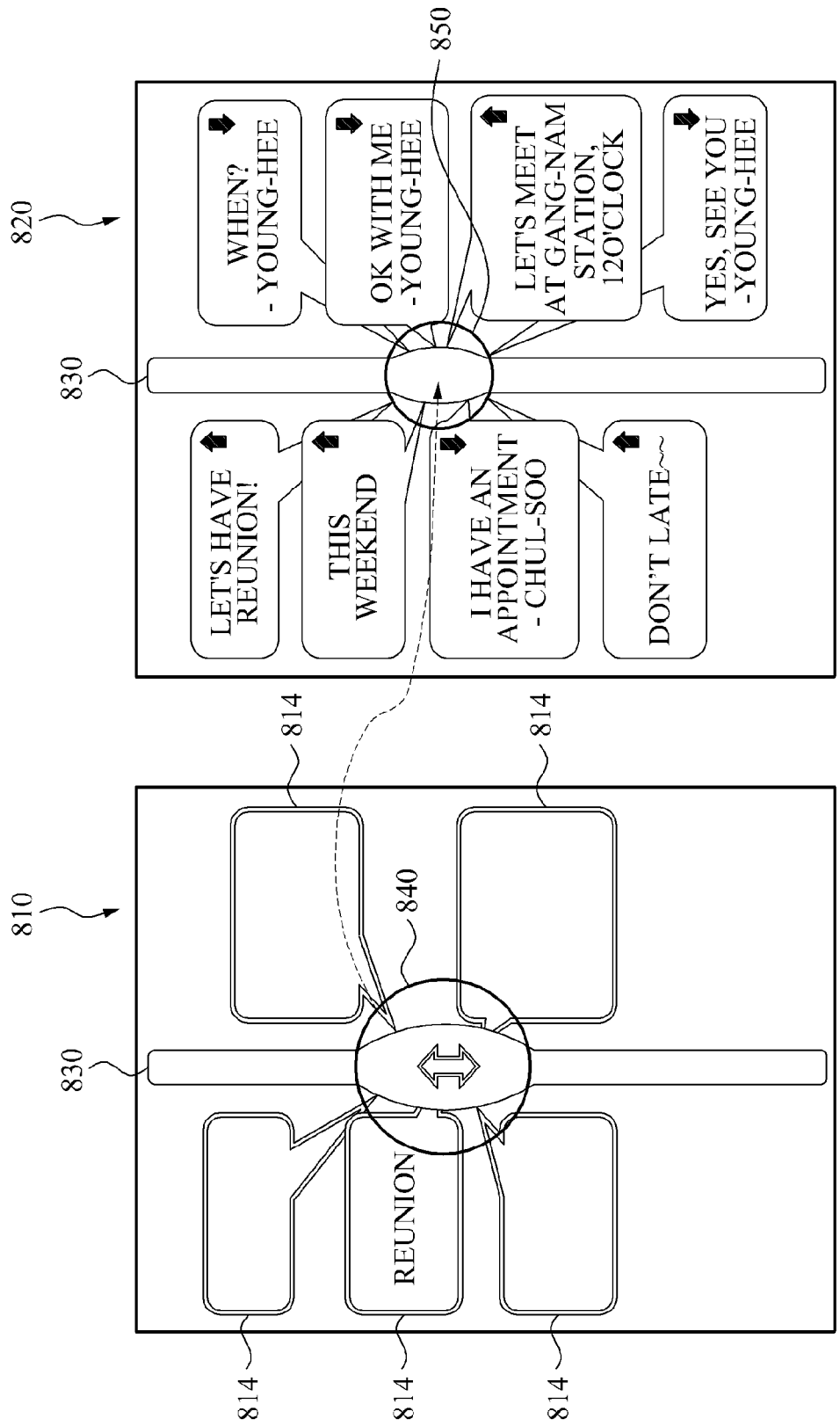
FIG. 8 illustrates an exemplary output screen in accordance with a level of a search indicator.

FIG. 8 illustrates an exemplary output screen depending on a level of a search indicator 840. Referring to FIG. 8, a type of an output message box may be changed depending on a level of the search indicator 840 moved on a reference axis 830. Here, the level of the search indicator 840 may designate a size of the search indicator and a type of the message box.

In an output screen 810, the search indicator 840 requesting an output of the group message boxes 814 is used, and in an output screen 820, a search indicator 850 requesting an output of the individual message boxes is used.

An output screen obtained where a combination or a division of message boxes is requested through the user interface unit 112 will be described in detail with reference to FIGS. 9 through 10.

Figure 9:
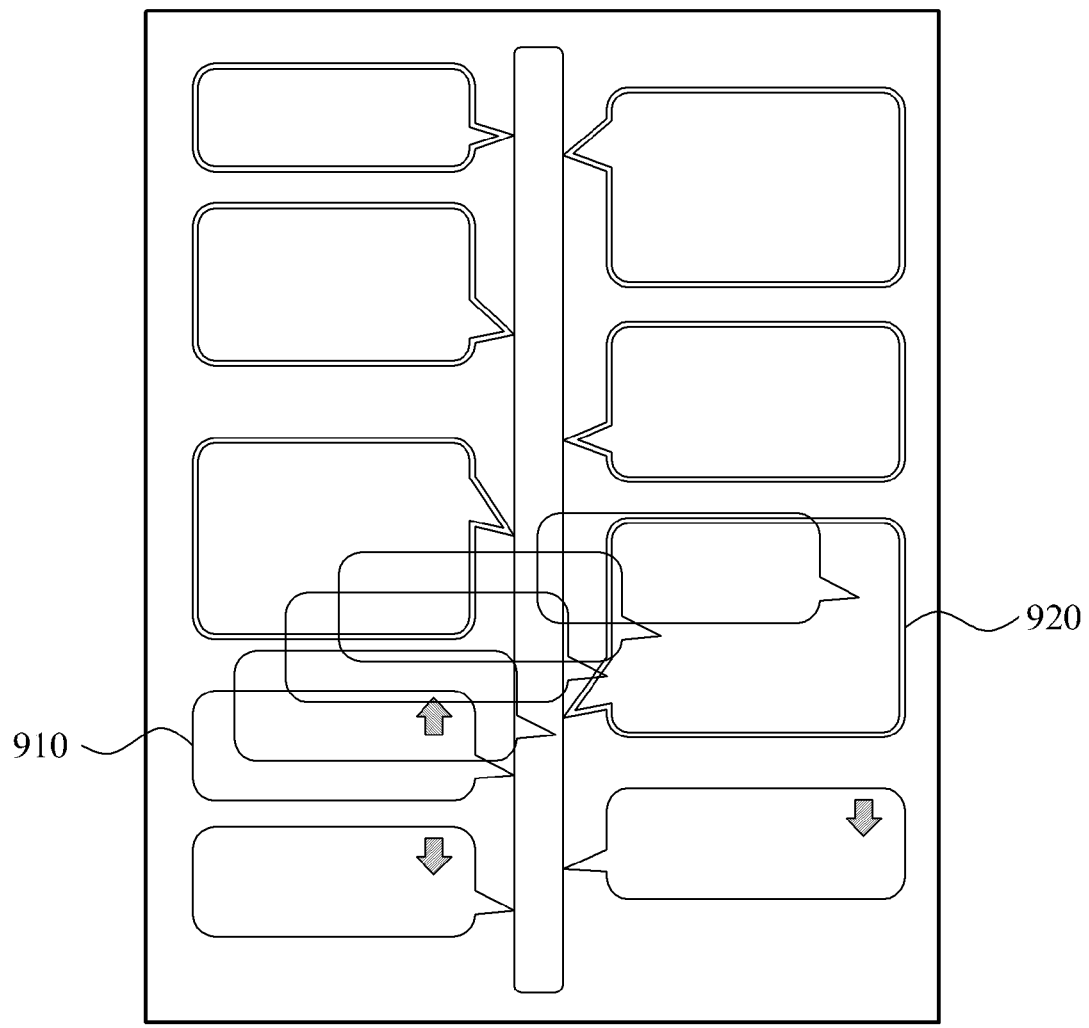
FIG. 9 is a diagram illustrating an example of combining exemplary message boxes.

FIG. 9 illustrates an example of combining exemplary message boxes.

Referring to FIGS. 1 and 9, in the user interface unit 112, an omission message box 910 to be omitted due to combination from among message boxes may be selected, and dragged and dropped on an addition message box 920 to be added due to combination to combine the omission message box 910 and the addition message box 920. The message box generation unit 116 may generate, in a location of the addition message box 920, a combined group message box including messages of the omission message box 910 and the addition message box 920.

Figure 10:
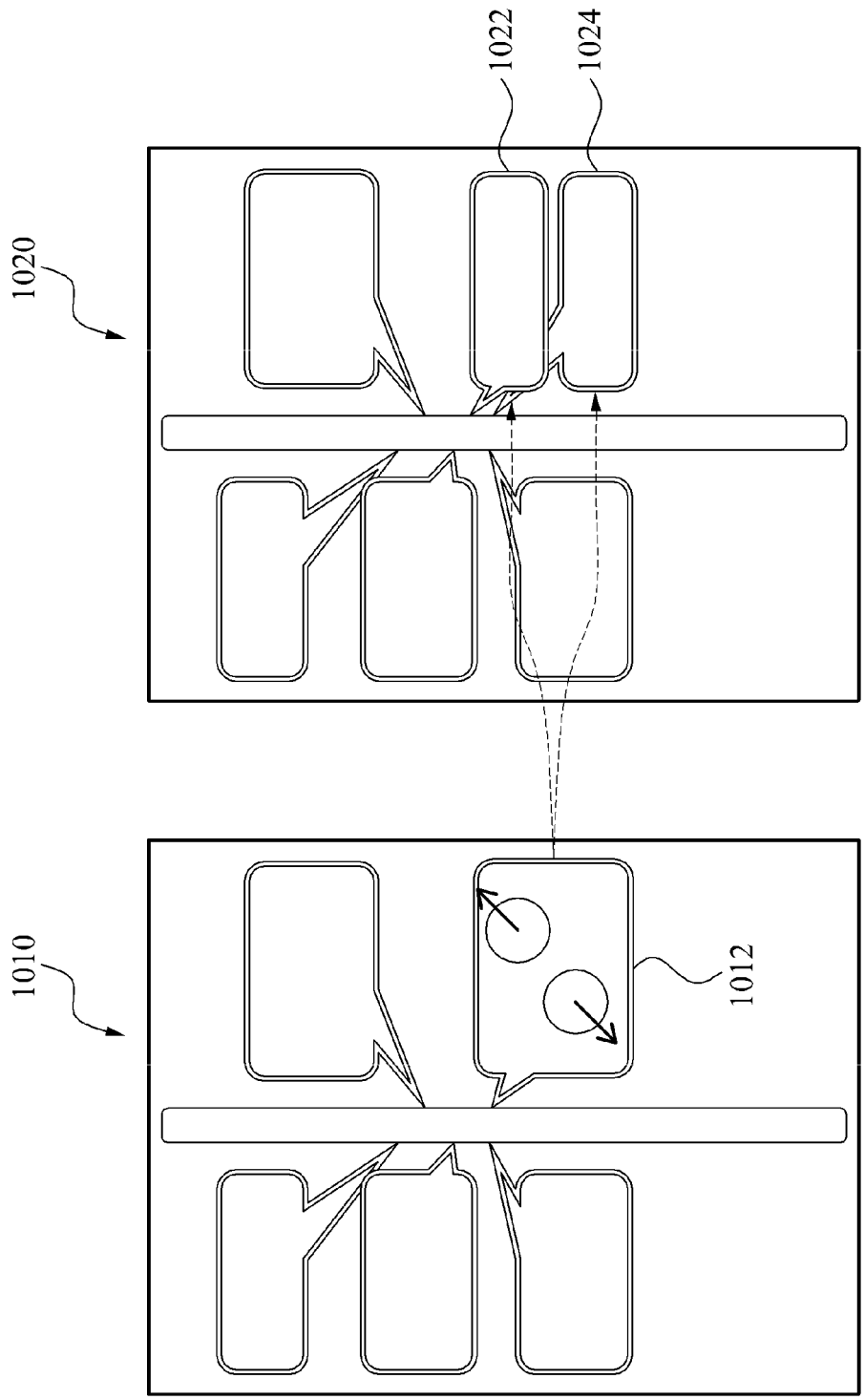
FIG. 10 is a diagram illustrating an example of dividing exemplary messages boxes.

FIG. 10 illustrates an example of dividing exemplary messages boxes. Referring to FIGS. 1 and 10, in the user interface unit 112, a group message box 1012 to be divided may be selected through a plurality of simultaneously performed user touches, from among message boxes of an output screen 1010 before division of the message boxes. Next, the message box generation unit 116 may divide the group message box 1012 into a predetermined number of message boxes 1022 and 1024 (grouped or individual) according to a grouping condition or user preference.

Referring to FIG. 1, the control unit 110 may control general operations of the apparatus of grouping and displaying messages, and control the user interface unit 112, the search unit 114, the message box generation unit 116 and the screen configuration unit 118. That is, the control unit 110 may perform functions of the user interface unit 112, the search unit 114, the message box generation unit 116, and the screen configuration unit 118. The above-described units controlled by the control unit 110 may be separately configured to classify and describe the above described functions. Accordingly, all of the above-described units may be configured to be controlled in the control unit 110, or only a portion thereof may be configured to be controlled in the control unit 110.

Hereinafter, a method of grouping and displaying the messages configured as described above will be described in with references to FIGS. 11 through 14.

Figure 11:
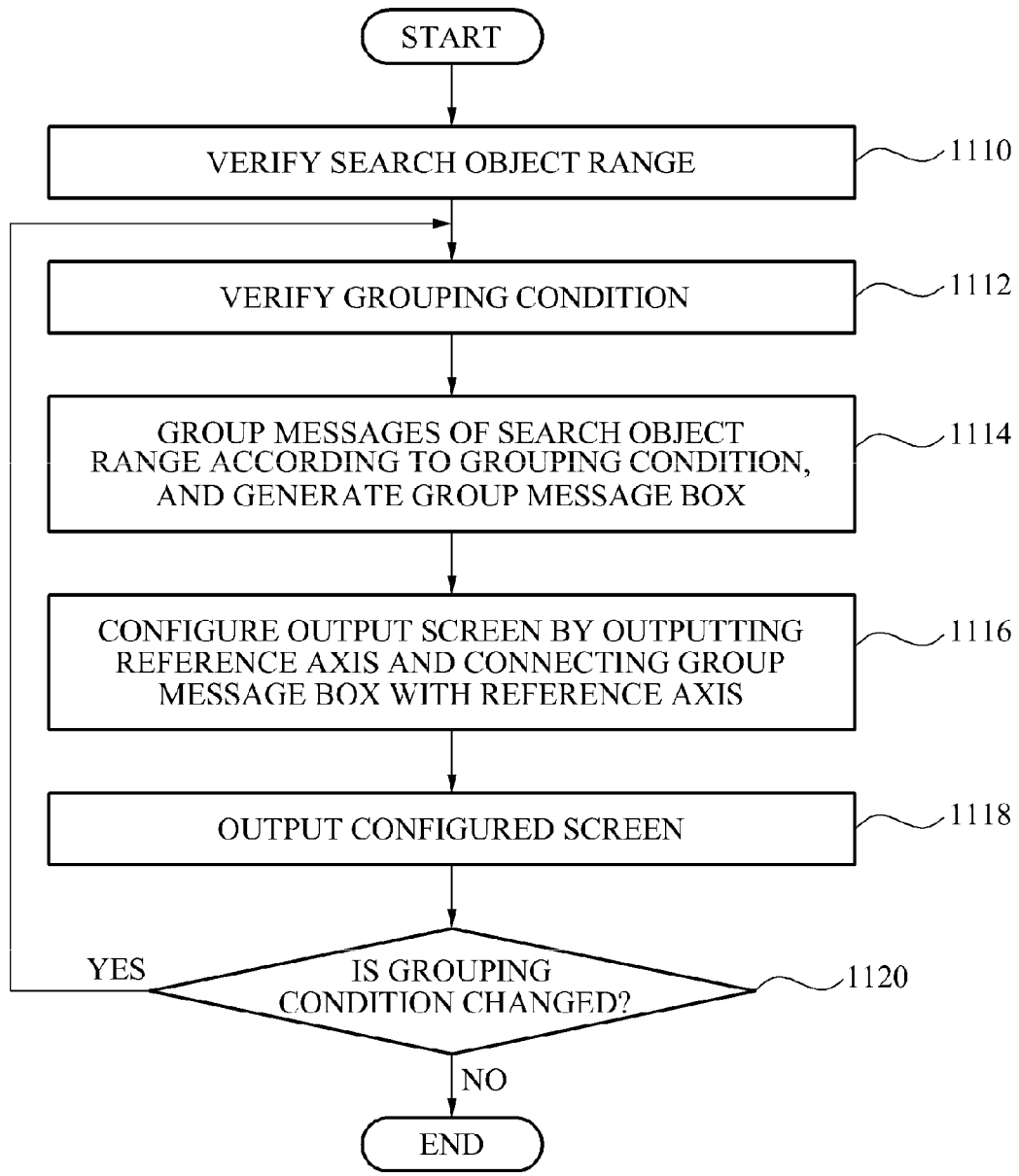
FIG. 11 is a flowchart illustrating an exemplary process of grouping and outputting messages

FIG. 11 illustrates an exemplary process of grouping and outputting messages.

Referring to FIG. 11, an exemplary apparatus to group and display messages may receive a request to receive an output of grouped messages, and then verifies a range of a message to be a search object at 1110. Accordingly, the range of the message to be the search object may be predetermined or input by a user.

The range of the message to be the search object may designate a message satisfying a search range based on a type of the message and a reference axis. For example, the message types may include an SMS sending message, an SMS receiving message, a multimedia sending message, a multimedia receiving message, an e-mail sending message, and an e-mail receiving message, and the search object may be at least one of the above message types. Also, the range based on the reference axis may designate messages corresponding to a location or width of the reference axis output on a screen.

At 1112, the exemplary apparatus verifies a grouping condition, and at 1114, the apparatus groups messages of the range of the search object to generate a group message box. The grouping condition may include at least one of a time grouping to group the messages in a predetermined time interval based on a transmitted or received time, an object grouping to group the messages based on an object to be transmitted/received, a type grouping to group the messages based on a type of the message, a number grouping to group the messages by a number of predetermined messages, and a context based grouping to group the messages based on contents of the message.

At 1116, the exemplary apparatus configures an output screen by outputting the reference axis and connecting the group message box with the reference axis, and at 1118, the apparatus displays the configured output screen.

At 1120, the apparatus verifies whether the grouping condition is changed. In response to the grouping condition being changed, the apparatus may repeat 1112 through 1120.

Figure 12:
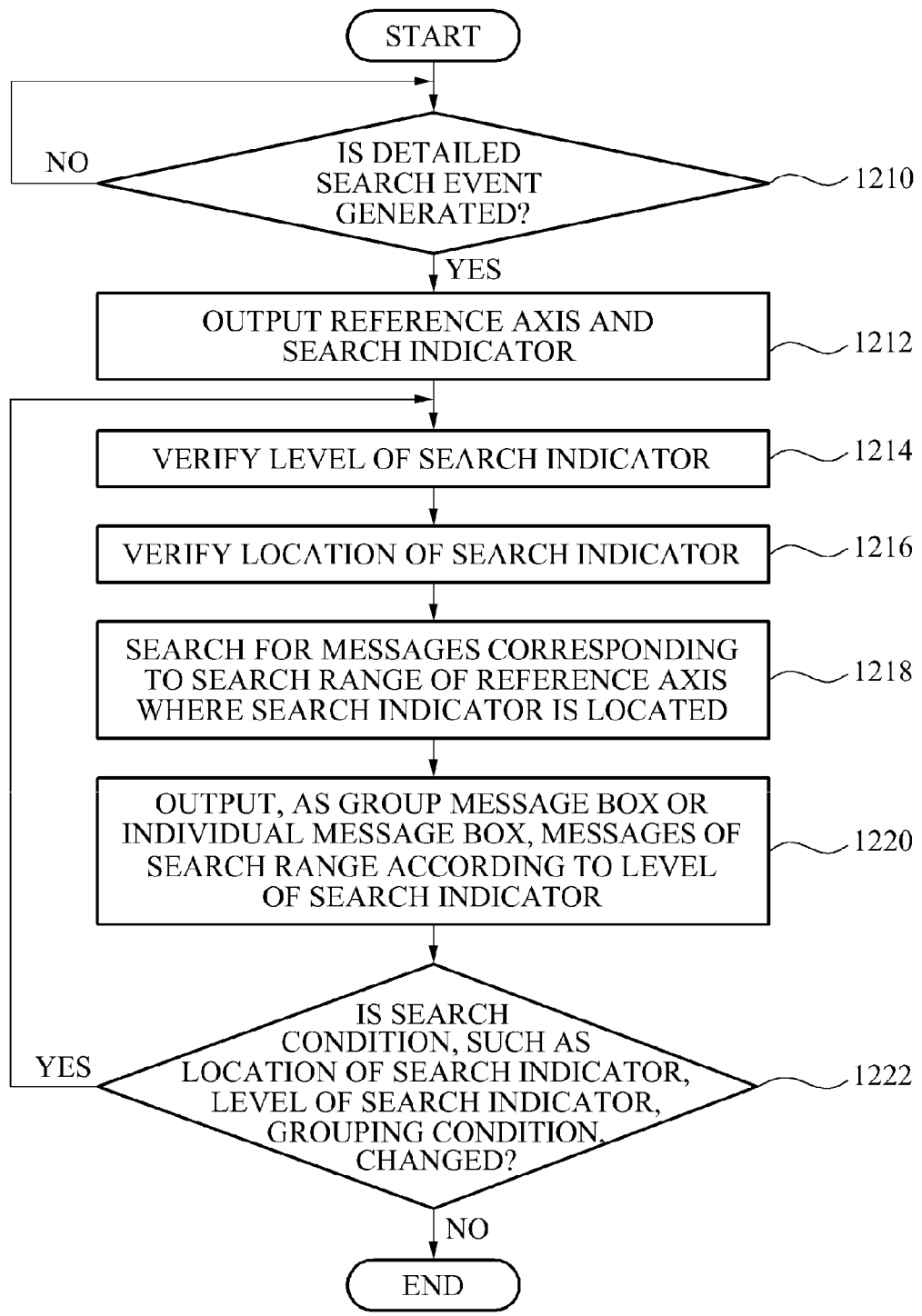
FIG. 12 is a flowchart illustrating an exemplary process of retrieving a message box using a search indicator

FIG. 12 illustrates an exemplary process of retrieving a message box using a search indicator.

Referring to FIG. 12, the exemplary apparatus senses a generation of an event of a detailed search in 1210, and proceeds to 1212 to output the reference axis and the search indicator. Accordingly, the reference axis designates a predetermined reference axis or a reference axis selected by an input of a user.

At 1214, the exemplary apparatus may verify a level of the search indicator, and in operation 1216, the apparatus may verify a location of the search indicator. Here, the level of the search indicator may designate a degree of grouping of messages, and may be output as the group message box or the individual message box according to the level of the search indicator. Also, the level of the search indicator may designate a degree of grouping of the group message box.

At 1218, the exemplary apparatus searches to find messages corresponding to a search range of the reference axis where the search indicator is located, and at 1220, the apparatus outputs the messages of the search range as the group message box or the individual message box according to the level of the search indicator.

At 1222, the exemplary apparatus verifies whether a search condition such as the location of the search indicator, the level of the search indicator, the grouping condition, etc., is changed. Where the search condition is changed, the apparatus may repeat 1212 through 1220.

Figure 13:
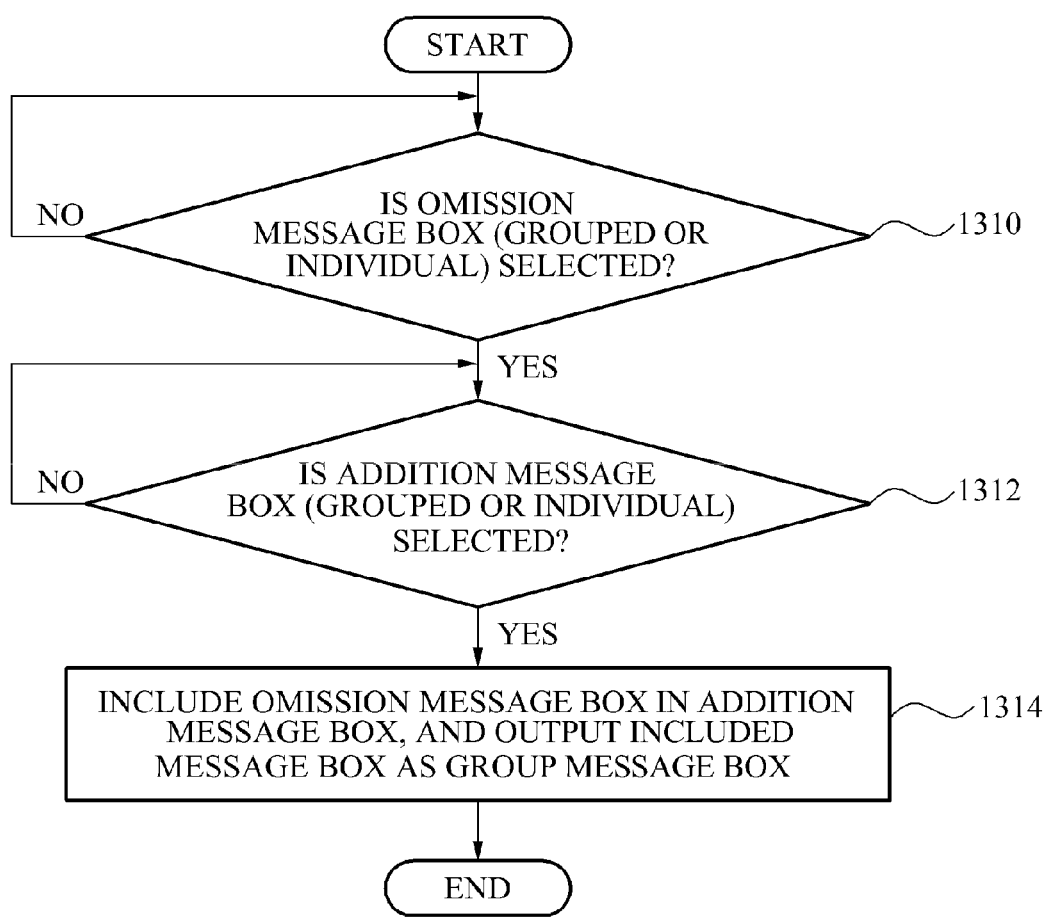
FIG. 13 is a flowchart illustrating an exemplary process of combining message boxes.

FIG. 13 illustrates an exemplary process of combining message boxes.

Referring to FIG. 13, where a selection of an omission message box (grouped or individual) to be omitted due to combination is sensed at 1310, the exemplary apparatus proceeds to 1312 to sense whether an addition message box (grouped or individual) to be added due to combination is selected.

Where the addition message box (grouped or individual) is selected at 1312, the exemplary apparatus proceeds to 1314, and includes the omission message box in the addition message box to output the included message box as a combined group message box.

Accordingly, the selection of the omission message box (grouped or individual) and the addition message box (grouped or individual) at 1310 and 1312 may be performed by a drag & drop operation. That is, the omission message box (grouped or individual) is selected, and dragged and dropped on the addition message box (grouped or individual), and thereby the omission message box (grouped or individual) and the addition message box (grouped or individual) may be selected.

Figure 14:
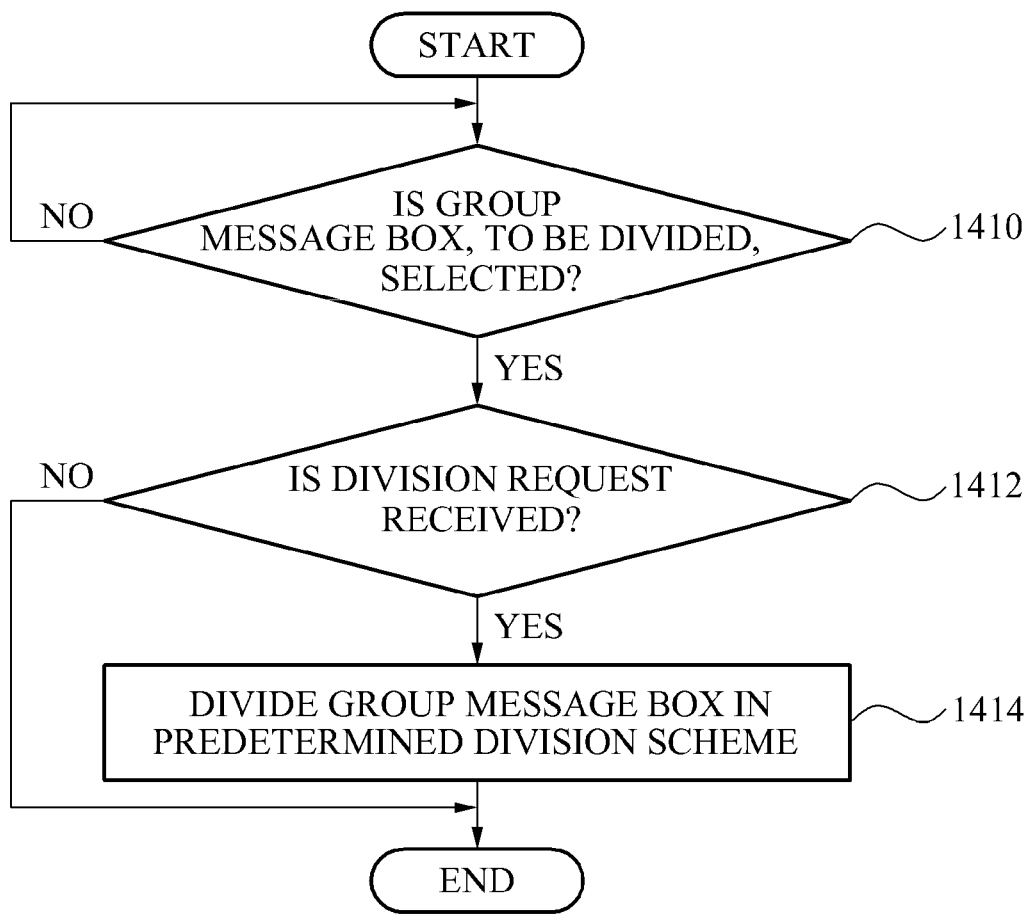
FIG. 14 is a flowchart illustrating an exemplary process of dividing message boxes.

FIG. 14 illustrates an exemplary process of dividing message boxes.

Referring to FIG. 14, where a selection of a group message box to be divided is sensed at 1410, the exemplary apparatus proceeds to 1412 to verify whether a division request is received. Where the division request is received based on the verified result at 1412, the exemplary apparatus divides the selected group message box to be divided in a predetermined division scheme at 1414.

Accordingly, the selection of the group message box to be divided and the reception of the division request may be performed using a plurality of user touches. That is, where at least two touches are sensed on the group message box to be divided, the exemplary apparatus may sense the at least two touches as a selection of the group message box to be divided, and where the at least two touches are dragged to be spaced apart from each other, the exemplary apparatus may sense the division request to be received.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As described above with reference to the above drawings, there is provided an exemplary apparatus and method of grouping and displaying messages in which many messages are grouped in various standards, and the grouped messages are disposed according to a reference axis. Accordingly, it is possible to propose an intuitive message expressing method. Also, it is possible to easily search through many stored messages using a simple and intuitive interface. Furthermore, a user may view both sides of text conversations in a more readable and logical display.

According to example(s) described above, provided are an apparatus and method of grouping transmitted/received messages in various standards and automatically displaying the grouped messages.

A number of examples of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus to group and display messages, the apparatus comprising:
 a message box generation unit to verify a grouping condition with respect to messages, and to generate group message boxes obtained by grouping the messages in accordance with the grouping condition;
 a screen configuration unit to configure an output screen by outputting a reference axis to arrange the group message boxes in accordance with the grouping condition, and by connecting the group message boxes with the reference axis, wherein the screen configuration unit configures the reference axis to be vertically or horizontally output on the output screen, arranges the group message boxes on the left and right of the reference axis in response to the reference axis being vertically output, and arranges the group message boxes above and below the reference axis in response to the reference axis being horizontally output; and
 a user interface unit to drag the reference axis in an axis direction to designate a search range, and to adjust the search range displayed on the output screen by increasing or reducing a width of the reference axis.

2. The apparatus of claim 1, wherein the message is at least one of a Short Message Service (SMS) sending message, an SMS receiving message, a multimedia sending message, a multimedia receiving message, an e-mail sending message, and an e-mail receiving message.

3. The apparatus of claim 1, wherein:
the message box generation unit generates a predetermined number of current messages as individual message boxes without grouping the predetermined number of current messages; and
the screen configuration unit configures the output screen by outputting the reference axis and connecting the group message boxes and the individual message boxes with the reference axis.

4. The apparatus of claim 1, wherein the grouping condition is at least one condition of a time grouping to group the messages in a predetermined time interval based on a transmitted or received time, an object grouping to group the messages based on an object to be transmitted and/or received, a type grouping to group the messages based on a type of the message, a number grouping to group the messages by a number of predetermined messages, and a context based grouping to group the messages based on contents of the message.

5. The apparatus of claim 1, wherein the reference axis is at least one of a time reference axis to indicate a passage of time, a dictionary reference axis to arrange an object in a dictionary manner, and a type reference axis to arrange a type of the message according to a type of the message.

6. The apparatus of claim 1, further comprising:
a user interface unit to announce a change in the grouping condition to the message box generation unit, in response to a sensed touch on the reference axis via a touch screen.

7. The apparatus of claim 1, further comprising:
a user interface unit to sense that an omission message box to be omitted due to combination, from among the group message boxes or the individual message boxes, is selected and dragged, and the omitted message box is dropped on an addition message box to be added due to the combination from among the group message boxes or the individual message boxes, wherein
the message box generation unit generates, in a location of the addition message box, a group message box including the addition message box and the omission message box.

8. The apparatus of claim 1, further comprising:
a user interface unit to sense a group message box to be divided is selected through a plurality of touches, wherein
the message box generation unit divides the group message box to be divided into a predetermined number of group message boxes or individual message boxes in accordance with the grouping condition.

9. The apparatus of claim 1, further comprising:
a search unit to verify a location of a search indicator moved on the reference axis, in response to a detailed search being requested, and to search to find messages corresponding to the reference axis where the search indicator is located, wherein
the message box generation unit generates retrieved messages as the group message boxes or as the individual message boxes, and the screen configuration unit configures the output screen by outputting the reference axis and the search indicator, and connecting the group message boxes or the individual message boxes with the reference axis.

10. The apparatus of claim 9, wherein the search unit verifies a level of the search indicator, determines whether to generate the retrieved messages as the group message boxes or the individual message boxes, and provides the determined result to the message box generation unit.

11. A method of grouping and displaying messages, the method comprising:
verifying a grouping condition with respect to messages;
generating group message boxes obtained by grouping the messages in accordance with the grouping condition;
configuring an output screen by outputting a reference axis to arrange the group message boxes in accordance with the grouping condition, and by connecting the group message boxes with the reference axis, wherein the configuring comprises configuring the reference axis to be vertically or horizontally output on the output screen, arranges the group message boxes on the left and right of the reference axis in response to the reference axis being vertically output, and arranges the group message boxes above and below the reference axis in response to the reference axis being horizontally output;
dragging the reference axis in an axis direction to designate a search range; and
adjusting the search range displayed on the output screen by increasing or reducing a width of the reference axis.

12. The method of claim 11, wherein the message is at least one of an SMS sending message, an SMS receiving message, a multimedia sending message, a multimedia receiving message, an e-mail sending message, and an e-mail receiving message.

13. The method of claim 11, further comprising:
generating a predetermined number of current messages as individual message boxes without grouping the predetermined number of current messages, wherein
the configuring configures the output screen by outputting the reference axis and connecting the group message boxes and the individual message boxes with the reference axis.

14. The method of claim 11, wherein the grouping condition is at least one condition of a time grouping to group the messages in a predetermined time interval based on a transmitted or received time, an object grouping to group the messages based on an object to be transmitted/received, a type grouping to group the messages based on a type of the message, a number grouping to group the messages by a number of predetermined messages, and a context based grouping to group the messages based on contents of the message.

15. The method of claim 11, wherein the reference axis is at least one of a time reference axis to indicate a passage of time, a dictionary reference axis to arrange an object in a dictionary manner, and a type reference axis to arrange a type of the message based on a type of the message.

16. The method of claim 11, further comprising:
changing the grouping condition in response to a sensed touch on the reference axis via a touch screen.

17. The method of claim 11, further comprising:
selecting and dragging an omission message box to be omitted due to a combination from among the group message boxes or the individual message boxes;
dropping the omission message box on an addition message box to be added due to the combination from among the group message boxes or the individual message boxes; and generating, in a location of the addition message box, a group message box including the addition message box and the omission message box.

18. The method of claim 11, further comprising:

selecting a group message box to be divided through a plurality of touches; and dividing the group message box to be divided into a predetermined number of group message boxes or individual message boxes in accordance with the grouping condition.

19. The method of claim 11, further comprising:

verifying a location of a search indicator moved on the reference axis in response to a detailed search being requested;

searching to find messages corresponding to the reference axis where the search indicator is located;

generating retrieved messages as the group message boxes or as the individual message boxes;

configuring the output screen by outputting the reference axis and the search indicator, and by connecting the group message boxes or the individual message boxes with the reference axis; and outputting the output screen.

20. The method of claim 19, further comprising:

verifying a level of the search indicator, wherein the generating of the retrieved messages determines whether to generate the retrieved messages as the group message boxes or the individual message boxes in accordance with the level of the search indicator.

* * * * *